United States Patent [19]
Chan

[11] Patent Number: 6,099,337
[45] Date of Patent: Aug. 8, 2000

[54] AUTOMATIC CLASPING CONNECTOR FOR SIM CARD (1)

[75] Inventor: Wen-Yao Chan, Taipei Hsien, Taiwan

[73] Assignee: L&K Precision Industry Co., Ltd., Taipei Hsien, Taiwan

[21] Appl. No.: 09/170,255

[22] Filed: Oct. 13, 1998

[51] Int. Cl.[7] .................................................. H01R 13/62
[52] U.S. Cl. ............................................ 439/326; 361/737
[58] Field of Search .................................... 439/326, 331, 439/325, 13, 10; 361/727, 737, 689, 680

[56] References Cited

U.S. PATENT DOCUMENTS

| | | |
|---|---|---|
| 5,245,169 | 9/1993 | Nakano ..................................... 235/486 |
| 5,933,328 | 8/1999 | Wallace et al. .......................... 361/737 |

*Primary Examiner*—Gary F. Paumen
*Assistant Examiner*—Alexander Gilman
*Attorney, Agent, or Firm*—Raymond Y. Chan; David and Raymond

[57] ABSTRACT

Disclosed herein is an automatic clasping connector for STM card characterized in that it comprises a metallic protecting cover and a read in recessed slot. The protecting cover is spendable and able to clasp the read-in recessed slot automatically after closing by means of combined function of a pair of movable hooks provided respectively at the top ends of two slots formed at two sides of the inner surface of the protecting cover for inserting a SIM card therein, a pair of fixed protruding blocks provided at top ends of the read-in recessed slot, and a spring installed at the bottom of the protecting cover, thereby the information in a securely and reliably held SIM card can be exactly read.

2 Claims, 7 Drawing Sheets

AUTOMATIC CLASPING CONNECTOR FOR SIM CARD (1)

BACKGROUND OF THE INVENTION

1. Field of the invention

The present invention relates to an automatic clasping connector for SIM (subscriber identity module) card, and more in detail, to an automatic clasping connector capable of protecting and holding a SIM card when it is inserted therein for identifying a subscriber's statue.

2. Description of the Prior Art

A conventional STM connector used in early days is shown in FIG. 1, wherein it has a fixed protecting cover on a read-in recessed slot. The device constructed as such is deemed to have a short life time caused by wearing out of the terminals therein after repeated inserting in and withdrawing out action of SIM cards, and moreover, a misreading or skipping of information may possibly occur therefor.

Referring to FIG. 2, it is another type of SIM card connector disclosed in U.S. Pat. No. 5,320,552, wherein it is characterized in that its protecting cover is slidable on the read-in recessed slot so as to hold a SIM card on the read-in recessed slot, but the user has to lock it by himself (herself), so it is by no means an ideal product.

To rectify the shortcoming of conventional SIM connectors described above, the inventor of the present invention has succeeded in developing an automatic clasping connector for SIM card through consistent effort for a long time, and the invention is now to be disclosed hereinafter.

SUMMARY OF THE INVENTION

It is a first object of the present invention to provide an automatic clasping connector for SIM card which can be hold reliably in a read-in recessed slot in the connector after the protecting cover has been clasped to the read-in recessed slot so that the information in the SIM card is able to be inputted assurely.

It is a second object of the present invention to provided an automatic clasping connector for SIM card wherein a SIM card may be easily inserted thereinto and withdrawn therefrom.

It is a third object of the present invention to provide an automatic clasping connector for SIM card with durability never to be influenced by frequent inserting and withdrawing actions of SIM cards, nor be causing any mis-reading or skipping information in a SIM card therefrom.

To achieve these and other objects, the present invention provides an automatic clasping connector for SIM card characterized in that it comprises a metallic protecting cover and a read-in recessed slot. The protecting cover is both opendable and able to clasp the read-in recessed slot automatically after closing by means of combined function of a pair of movable hooks provided respectively at the top ends of two slots formed at two sides of the inner surface of the protecting cover for inserting a SIM card therein, a pair of fixed protruding blocks provided at top ends of the read-in recessed slot, and a spring installed at the bottom of the protecting cover, thereby the information in a SIM card can be easily read.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
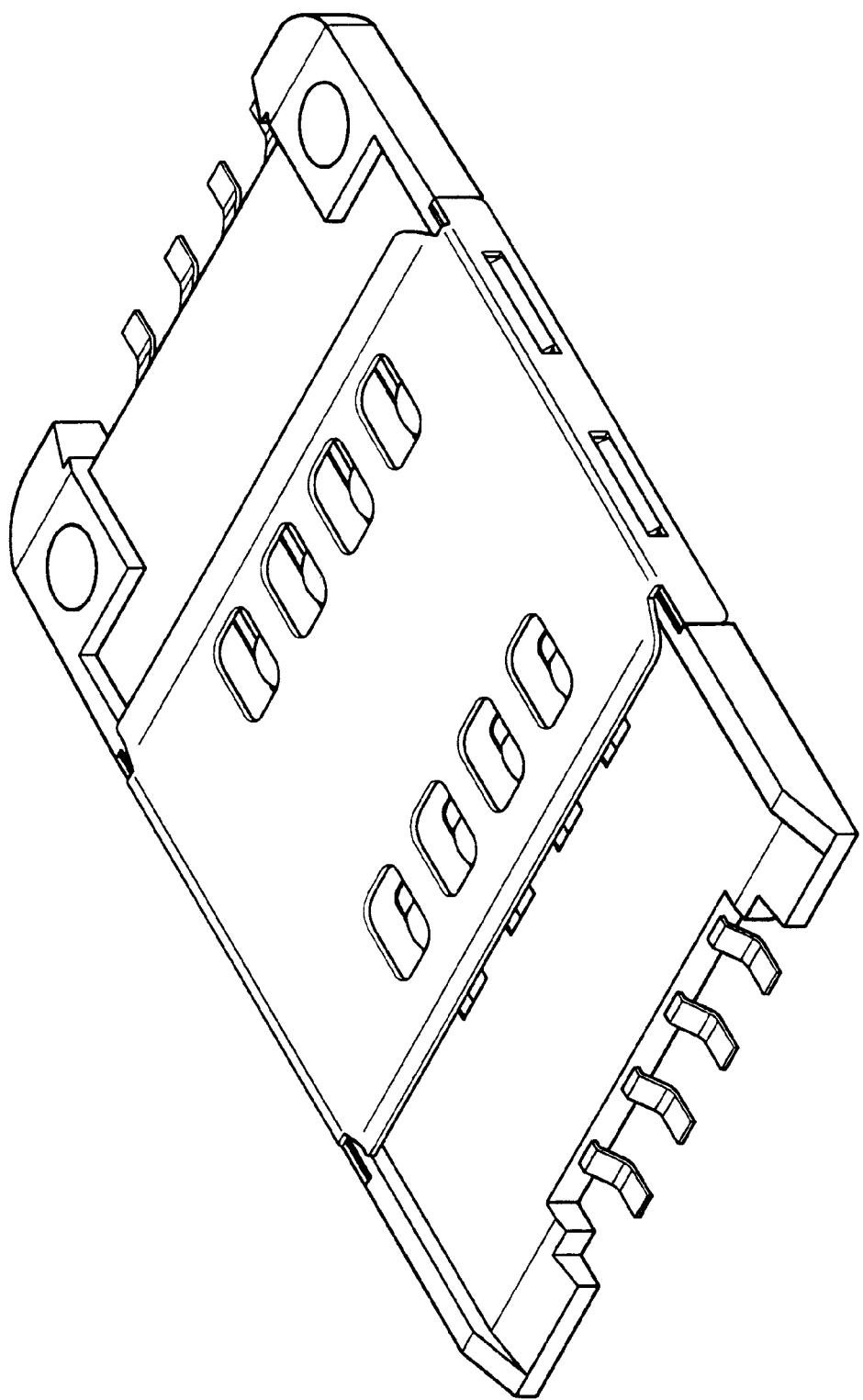
FIG. 1 is a drawing of conventional connector for SIM card.
Figure 2:
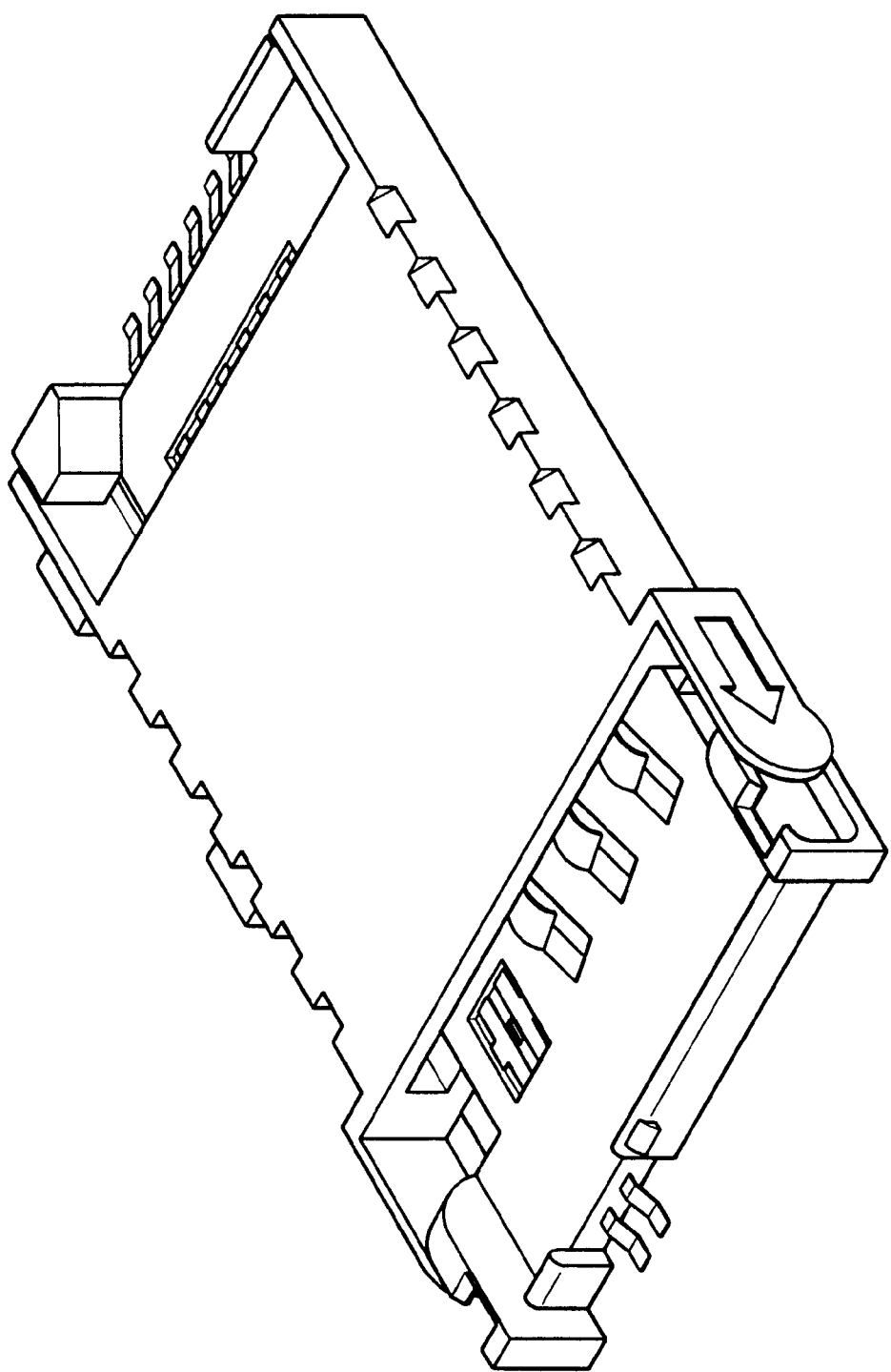
FIG. 2 is a drawing of another connector for SIM card disclosed in U.S. Pat. No. 5,320,552.
Figure 3:
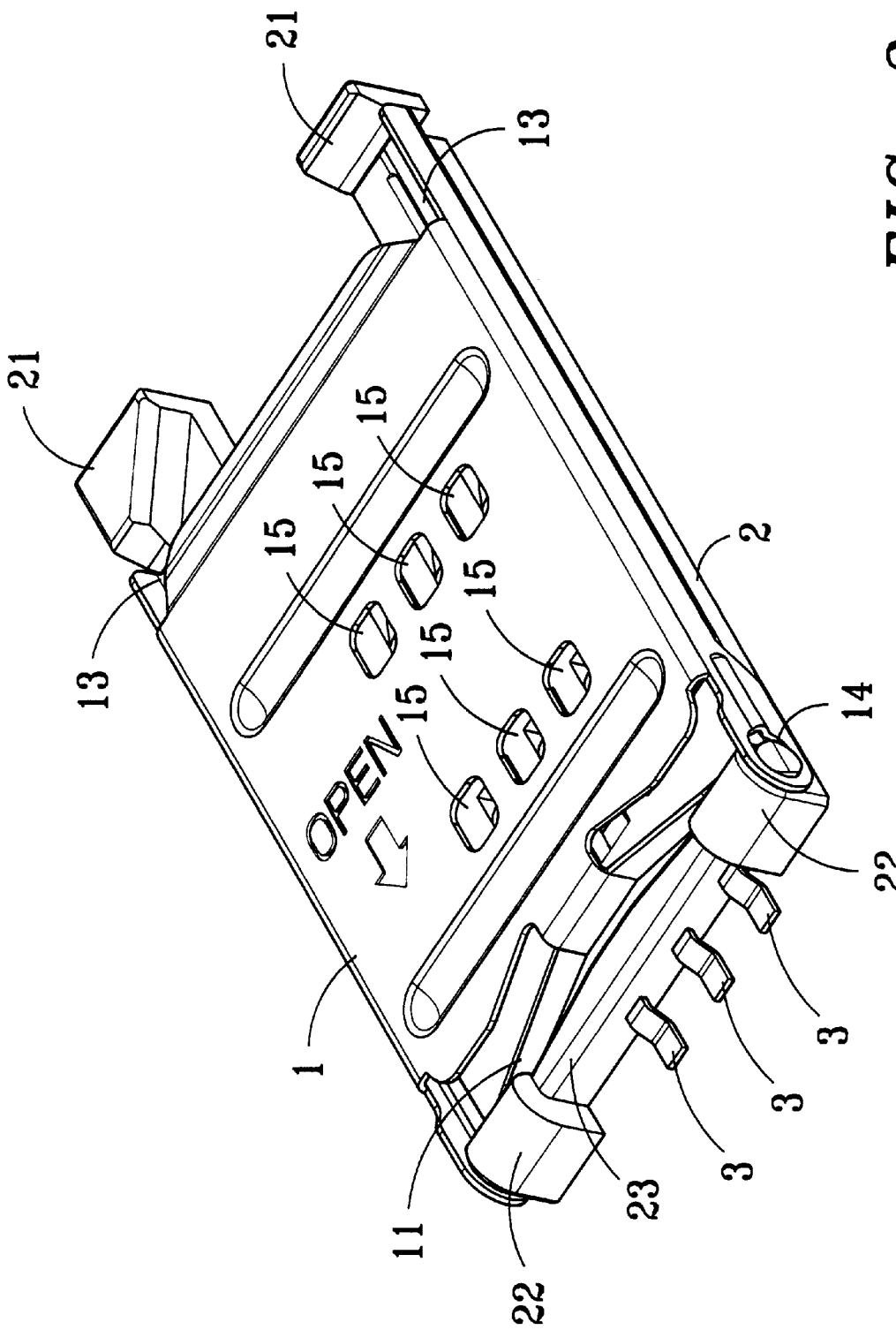
FIG. 3 is a three dimensional drawing of the automatic clasping connector for SIM card according to the present invention viewed from above.
Figure 4A:
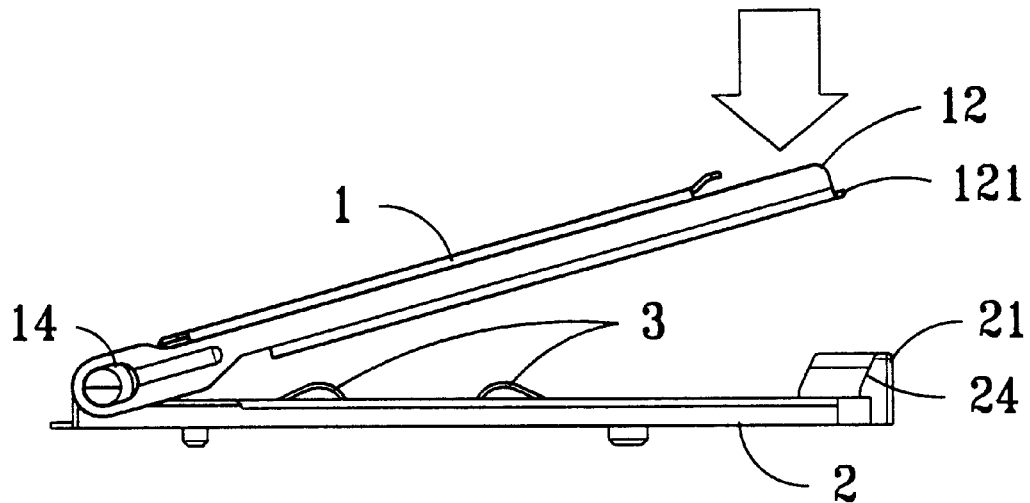
FIG. 4A is a side view showing the automatic connector of the present invention before automatically clasping.
Figure 4B:
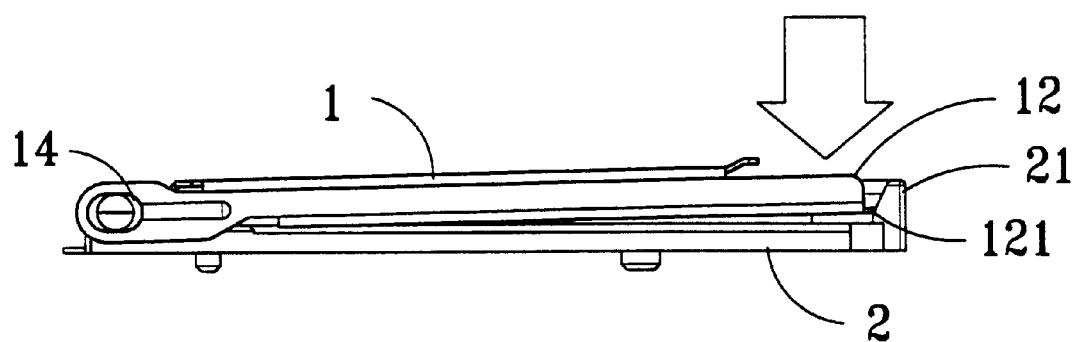
FIG. 4B is a side view showing the automatic clasping connector of the present invention which is about to clasp.
Figure 4C:
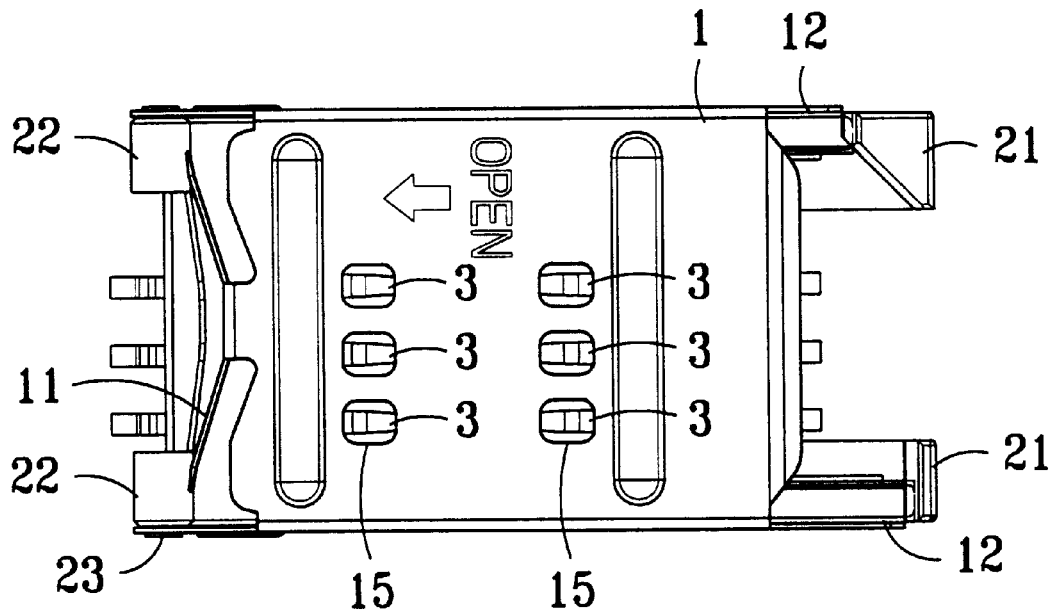
FIG. 4C is a drawing showing a top view of the automatic clasping connector of the present invention in a clasped state.
Figure 4D:
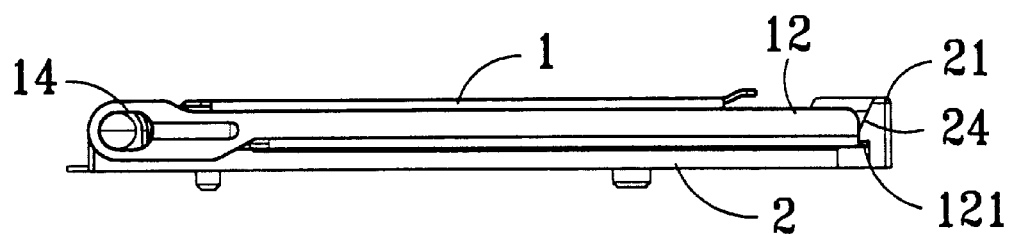
FIG. 4D is a drawing showing a side view of the automatic clasping connector of the present invention in a clasped state.
Figure 5A:
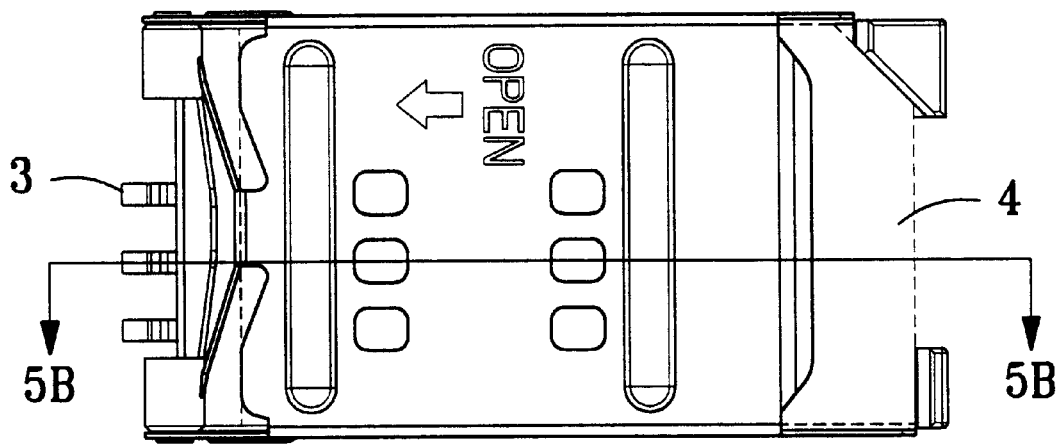
FIG. 5A is a drawing showing a top view of the automatic clasping connector of the present invention when a SIM card is held therein by clasping.
Figure 5B:
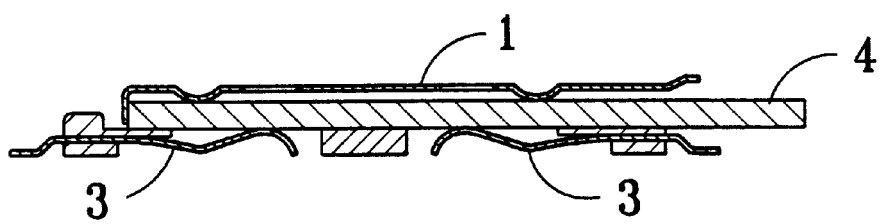
FIG. 5B is a cross sectional drawing of FIG. 5A cut along the line A—A.

Referring to FIG. 3 through FIG. 4D, the drawing showing the automatic clasping connector for SIM card in various states, wherein it comprises: a metallic protecting cover 1 opendable and able to clasp having a plurality of slots 15. There are a pair of slots 13 formed downwardly and inwardly in each side of the inner surface of the protecting cover 1 respectively so as to accommodate a SIM card 4 inserted thereinto. Both slots 13 respectively have a tail which extends downwardly and each of the tails is provided with a through hole 14. Furthermore, a pair of movable hooks 121 are formed respectively at the top ends of both slots 13 (see FIG. 4A).

There is a downwardly supported spring 11 installed at the bottom portion of the protecting cover 1 thereby forming a reaction force when it is pressed against the bottom portion of the cover 1 (see FIG. 4C).

A read-in recessed slot 2 which may clasp each other with the protecting cover 1, are equipped with several terminals 3 at its bottom each opposite to the slots 15 formed on the protecting cover 1. When the protecting cover 1 is closed on and clasps the read-in recessed slot 2 without insertion of any SIM card 4, at this time, each slot 15 formed on the protecting cover 1 just comes above to its respectively opposing terminal 3 so as to prevent possibility of a short circuiting.

Two hinged joint 22, with an axis 23 therebetween, are provided at each end of the read-in recessed slot 2, and the axis 23 whose diameter being less than that of the through hole 14, is inserted into the through holes 14. The spring 11, as a source of resilient force, is spanning the two hinged joints 22. The read-in recessed slot 2 has two protruding ends, on each end forming a fixed protruding block 21 to clasp the corresponding movable hook 121.

Referring to FIGS. 4A–4D, and FIGS. 5A–5B, when a SIM card 4 is inserted to the slot 13 of the protecting cover 1 and the cover 1 is closed containing the SIM card 4 therebetween, at this moment the movable hooks 121 at the top ends of slots 13 squeeze each other with the fixed protruding blocks 21, causing the bottom of the protecting cover 1 to make a slight displacement thereby allowing the protecting cover 1 to close completely. At this time, the above mentioned movable hooks 121 and fixed protruding blocks 21 clasp each other by the reaction force of the spring 11 spanning the two hinged joint 22 installed at the bottom of the protecting cover 1 so that the SIM card is securely held in its position.

The fixed protruding block 21 is formed into a shape having a tilted angle for the convenience of clasping each other with the movable hook 121.

Figure 6A:
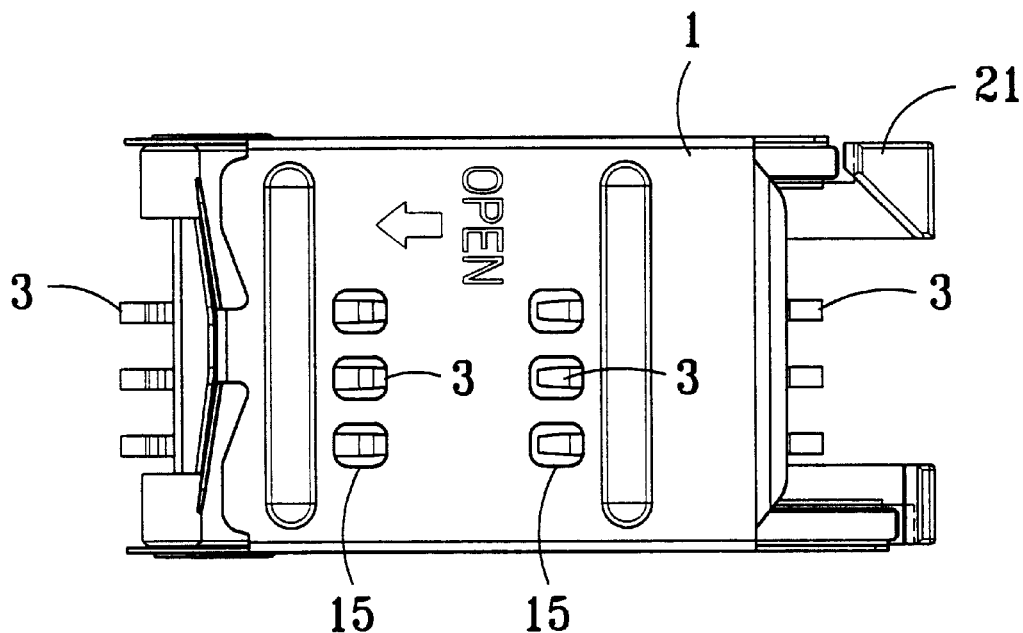
FIG. 6A is a drawing showing a top view of the automatic clasping connector of the present invention when its protecting cover is about to be opened.
Figure 6B:
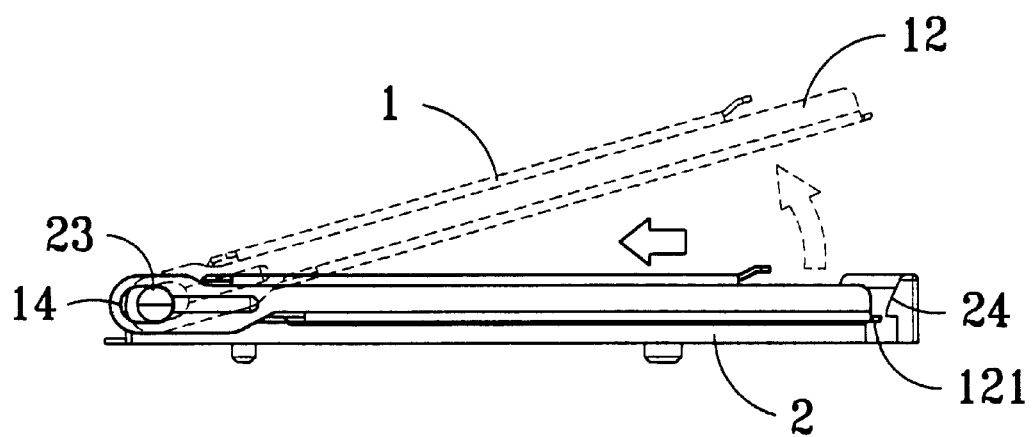
FIG. 6B is a drawing showing a side view of the automatic clasping connector of the present invention where the protective cover is on its way of opening.

Referring to FIGS. 6A and 6B, when opening the connector of the present invention exerting a force to the bottom of the protecting cover 1 to release the movable hooks 121 from the fixed protruding blocks 21, and the protecting cover 1 may be automatically separated from the read-in recessed slot 2.

In conclusion, the automatic clasping connector for SIM card has the advantages compared to the conventional connectors cited above, and are as follows:

1. The product according to the present invention can hold a SIM card reliably in the read-in recessed slot so that its information is able to be inputted surely.

2. The product according to the present invention can make a SIM card easily inserted thereinto and withdrawn therefrom.

3. The product according to the present invention can ensure a durability never to be influenced by frequent inserting and withdrawing actions of SIM cards, nor be causing any mis-reading or skipping information in a SIM card therefrom.

Many changes and modifications in the above described embodiment of the invention can, of course, be carried out without departing from the scope thereof. Accordingly, to promote the progress in science and useful arts, the invention is disclosed and intended to be limited only by the scope of the appended claims.

What is claimed is:

1. An automatic clasping connector for receiving a SIM card, comprising:

a metallic protecting cover which is opendalbe and claspable, having a plurality of slots, a pair of side slots formed downwardly and inwardly in two inner surfaces of two side walls of the protecting cover respectively so as to accommodate said SIM card inserted thereinto, wherein each of said side walls has a tail extended downwardly and each of said tails is provided with a through hole, and that a pair of movable hooks are formed at two top ends of said two side walls respectively;

a downwardly supported spring which is installed at a bottom portion of said protecting cover to provide a reaction force when said spring is pressed against said bottom portion of said protecting cover;

a read-in recessed seat for clasping with said protecting cover, wherein said read-in recessed seat has a plurality of terminals provided at a bottom thereof and aligned opposing to said slots formed on said protecting cover respectively, so that when said protecting cover is closed on said read-in recessed seat by clasping said read-in recessed seat before insertion of said SIM card, each of said slots formed on said protecting cover just comes above to said respective opposing terminals so as to prevent short circuiting, wherein said read-in recessed seat further comprises two hinged joints provided at two ends thereof respectively and has two protruding ends forming two fixed protruding blocks to clasp two movable hook provided at two top ends of said side slots respectively; and an axle, which has a diameter less than that of said through holes, is extended between said two hinged joints and has two ends inserted into said two through holes respectively while said spring is spanning said two hinged joints;

thereby, when said SIM card is inserted to said side slots of said protecting cover, said two movable hooks at the top ends of said side slots squeeze each other with said two fixed protruding blocks, causing said bottom of said protecting cover to make a slight displacement, so as to allow said protecting cover to close completely, moreover said two movable hooks and said two fixed protruding blocks clasp with each other by the reaction force of said spring until spanning said two hinged joints installed at said bottom of said protecting cover so as to securely hold said SIM card in position.

2. The automatic clasping connector as recited in claim 1 wherein each of said fixed protruding block is formed in a shape having a tilted angle for easy clasping with said respective movable hook.

* * * * *